United States Patent Office 3,247,250
Patented Apr. 19, 1966

3,247,250
CARBOXAMIDO N-SUBSTITUTED
TETRACYCLINES
Christopher Richard Tamorria, Nanuet, N.Y., assignor to Eastman Kodak Company, Rochester, N.Y., a corporation of New Jersey
No Drawing. Filed Sept. 30, 1964, Ser. No. 400,544
15 Claims. (Cl. 260—559)

This invention relates to new and useful antibacterial agents which are derivatives of the tetracycline antibiotics and, more particularly, to compounds of the general formula:

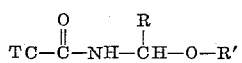

$$TC-\overset{O}{\overset{\|}{C}}-NH-\overset{R}{\overset{|}{C}H}-O-R'$$

wherein TC represents all except the 2-carboxamido group of a member selected from the group consisting of tetracycline, 7-chlorotetracycline, 7-bromotetracycline, 5-hydroxytetracycline, 6-demethyltetracycline and 6-demethyl-7-chlorotetracycline; R is hydrogen or lower alkyl; and R' is lower alkyl or phenyl lower alkyl. Suitable lower alkyl groups contemplated by the present invention are those having from 1 to 6 carbon atoms, whereas suitable phenyl lower alkyl groups are, for example, benzyl, phenethyl, etc.

The tetracycline antibiotics include tetracycline, 7-chlorotetracycline, 7 - bromotetracycline, 5 - hydroxytetracycline, 6-demethyltetracycline and 6-demethyl-7-chlorotetracycline. Because all are useful in the present invention and are substantially equivalent, the present invention will be described for illustrative purposes primarily in terms of tetracycline itself, but it will be understood that the same teachings are applicable to all six tetracycline antibiotics. Tetracycline itself is the most useful; tetracycline, 7-chlorotetracycline and 6-demethyl-7-chlorotetracycline form a preferred sub-group because of their ready availability and demonstrated clinical utility.

It is an object of the present invention to provide derivatives of the tetracycline antibiotics having improved utility, that is, being less toxic, more stable, more effective, more easily absorbed on oral administration, more easily administered by intravenous or intramuscular injection or more soluble in water or body fluids.

In the past, it has proven difficult to prepare antibacterial derivatives of the tetracycline antibiotics because of the large number of reactive centers in this molecule. Thus, many reagents remove water from ring C to make it aromatic; this produces an anhydrotetracycline which has only minor antibacterial activity. Attempts to acylate the alcohol or phenolic hydroxyl groups in the molecule have simultaneously removed water from the 2-carboxamido group to give inactive nitriles which could not be hydrated back to carboxamides. Removal of the 4-dimethylamino group has given inactive compounds. Attempts to alkylate tetracycline has resulted in aromatization of ring C and substitution on the 2-carboxamido group. Certain esters of tetracycline antibiotics are disclosed in Canadian Patent 516,567 and French Patent 1,098,947. It is therefore a further object of the present invention to provide antibacterial derivatives of the tetracycline antibiotics containing the original 4-dimethylamino group and the orginal 2-carboxamido group.

As indicated above, the novel derivatives of the present invention possess appreciable biological activity against a variety of pathogenic microorganisms. Furthermore, they provide a more sustained effect due to slow in vivo hydrolysis. The toxicity of the new derivatives is not appreciably higher than that of the tetracycline antibiotics themselves. It has been established that the novel derivatives of the present invention result in appreciable antibiotic activity in the blood serum over a considerable period after administration by the oral route.

In the following table are summarized the in vivo activities of typical compounds of the present invention. The activities are expressed as fractions of the parent antibiotic (as the hydrochloride salt) which is given a value of unity. Infected mice (*Staph. aureus*) are treated with the test compound and the results compared to the protection afforded by the parent under the same conditions. Routes of administration were intravenous (I), oral (O), and subcutaneous (S).

| Compound | Fraction of Bioactivity by Various Routes | | | Parent Antibiotic |
|---|---|---|---|---|
| | I | O | S | |
| N-(1-Methoxy)-methyl-tetracycline. | ¼ | ⅟₁₆ | ⅛ | Tetracycline hydrochloride. |
| N-(1-Methoxy)-ethyl-tetracycline. | ¼ | ¼–½ | ¼ | Do. |
| N-(1-Methoxy)-propyl-tetracycline. | ¼ | ¼–½ | ½ | Do. |
| N-(1-Methoxy)-methyl chlortetracycline. | ⅟₁₆ | ⅟₁₆ | ⅟₁₆ | 7-Chlorotetracycline hydrochloride. |
| N-(1-Methoxy)-ethyl-chlortetracycline. | ⅟₁₆ | ¼ | ¼ | Do. |
| N-(1-Methoxy)-propyl-chlortetracycline. | ¼ | 1 | ¼ | Do. |

The novel derivatives of the present invention are readily prepared by reaction of the appropriate tetracycline antibiotic with a lower alkanal and a lower alkanol or a phenyl lower alkanol. Most conveniently, a large molar excess of the alkanol may be employed as solvent. When a volatile alkanal is employed such as formaldehyde, acetaldehyde and propionaldehyde, then a large molar excess (about 30 molar equivalents) is indicated due to the volatility of the alkanal. When using less volatile alkanals, smaller molar excesses (about 4 molar equivalents) may be used with satisfactory results. The reaction is conveniently carried out at the reflux temperature of the alkanol solvent for a period of time of from about 30 minutes to about 4 hours or more. After completion of the reaction, excess solvent and aldehyde are removed in vacuo, and the product taken up in a suitable organic solvent (e.g., chloroform), the organic phase is washed with water, dried and evaporated in vacuo to give the desired product.

The novel derivatives of the present invention are capable of forming salts with either organic or inorganic acids. Such salts may be readily prepared by the simple addition of one equivalent of acid to the tetracycline derivative in an inert organice solvent such as methanol or ethanol. These salts include those prepared from acids such as hydrochloric, sulfuric, sulfamic, tartaric, hydrobromic, hydriodic, glycolic, citric, maleic, phosphoric, succinic, acetic, ascorbic and the like. Furthermore, the novel derivatives of the present invention may form a variety of salts either with inorganic or organic bases. Exemplary of these salts are alkali metal salts such as sodium and potassium salts, the ammonium salts, alkaline earth metal salts such as the calcium salts, as well as salts with primary amines such as ethylenediamine. Such salts, of course, are prepared by conventional procedures recognized by those skilled in the art.

The novel derivatives of the present invention may be incorporated with various suitable pharmaceutical carriers in dosage forms which are of value for administration to mammals in the treatment of a variety of infections. Essentially any inert pharmaceutical carrier may be used, that is, any substance which is useful for the preparation of dosage forms and which does not tend to inactivate the antibiotic substance. Thus, the novel compounds may be incorporated into capsules with various inert materials or these compounds may be converted into tablets by incorporation with certain tableting agents, such as gums, either natural or synthetic, sweetening agents, coating agents and so forth. Alternatively, the compounds of the present invention may be utilized in the form of injectable preparations. For administration by the intramuscular route, the medium for the active compounds may be water, saline, non-toxic vegetable oils, and other materials of this nature. For administration by the intravenous route, care must be taken to make certain that a clear solution in water, saline, or glucose solution is prepared. It should be noted that, upon prolonged storage in aqueous solution, the antibiotic activity may be lost to an appreciable extent and there may be a tendency for solid materials to separate. Certain other dosage forms, such as ointments or salves, may be prepared with a suitable base, preferably a non-hydrophilic base, such as petroleum jelly and substances of this nature.

The novel compounds of the present invention are also useful as intermediates in chemical conversions where a blocking group on the 2-carboxamido group is needed. As mentioned previously, the 2-carboxamido group is readily dehydrated to the 2-cyano group by many reagents. Upon completion of the desired conversions, the blocking group may then be removed by acid hydrolysis.

The invention will be described in greater detail in conjunction with the following specific examples.

EXAMPLE 1

*Preparation of N-(1-methoxy)-methyltetracycline (methanolate)*

Tetracycline (26.64 g.; 0.06 mole) was added to a stirred mixture of methanol (360 ml.) and a solution of 46% formaldehyde in methanol (120 ml.), then refluxed 2 hours. After cooling to room temperature the clear solution was placed in a refrigerator for several days. The crystalline product was filtered, washed with cold methanol, then with cold anhydrous ether. The light-yellow crystalline product was dried in a vacuum oven. The yield was 12.7 g. (41%), calculated as the methanolate.

EXAMPLE 2

*Preparation of N-(1-methoxy)-methyltetracycline*

N-(1-methoxy)-methyltetracycline methanolate (10 g.; 0.019 mole) was added to water (15 ml.), and to the stirred slurry was added 1 N NaOH to pH 8.8. After filtration, to rid of small particles, the clear filtrate was stirred and the pH adjusted to 5.7 with 1 N HCl. Crystallization began almost immediately. After cooling, the crystals were filtered, and washed with water. The product was dried in a vacuum oven. The yield was 7.85 g. of light-yellow crystalline N-(1-methoxy)-methyltetracycline.

EXAMPLE 3

*Preparation of N-(1-methoxy)-ethyltetracycline*

Tetracycline (4.44 g.; 0.01 mole) was added to a mixture of stirred methanol (75 ml.) and acetaldehyde (25 ml.) and the mixture refluxed 2.5 hours, during which a clear amber solution developed. After cooling to room temperature, the major portion of the solution (85 ml.; approx. 85%) was taken to dryness in vacuo, then worked up with anhydrous ether to give a solid (2.0 g.). An analytical sample was obtained by dissolving 1.5 g. of the crude product in chloroform (125 ml.) then washing with portions of water. The chloroform was dried over anhydrous $Na_2SO_4$, taken to dryness in vacuo, and worked up with anhydrous ether to yield 400 mg. of pure N-(1-methoxy)-ethyletetracycline.

EXAMPLE 4

*Preparation of N-(1-methoxy)-propyltetracycline*

Tetracycline (8.88 g.; 0.02 mole) was added to a stirred mixture of methanol (150 ml.) and propionaldehyde (50 ml.), and the mixture refluxed 2.5 hours, then cooled in an ice-water bath, and taken down in vacuo. The residue was worked up with anhydrous ether, filtered, and dried in a vacuum oven. The yield of crude product was 3.65 g. An analytical sample was obtained by dissolving 2.4 g. of the crude material in chloroform (300 ml.) and washing with portions of water. The chloroform solution was dried over anhydrous $Na_2SO_4$, filtered, and taken down in vacuo. The residue was worked up with anhydrous ether to yield 250 mg. of pure N-(1-methoxy)-propyltetracycline.

EXAMPLE 5

*Preparation of N-(1-methoxy)-methylchlortetracycline*

Chlortetracycline (24.0 g.; 0.05 mole) was added to a stirred mixture of methanol (300 ml.) and a solution of 46% formaldehyde in methanol (100 ml.). The mixture was refluxed 45 minutes (during which complete solution resulted), cooled in an ice-water bath and taken down in vacuo to a small volume. The oil thus obtained was precipitated into 400 ml. stirred anhydrous ether. After filtration, the solid product was washed well with anhydrous ether, and dried in a vacuum oven. The yield of crude product was 19.3 g. Analytically pure product was obtained as follows: 3 g. of the crude material was added to water (45 ml.) and extracted three times with chloroform (100, 50, 50 ml.). After combination of the chloroform extracts and washing with water, the chloroform solution was dried over anhydrous $Na_2SO_4$, filtered, and taken to near dryness in vacuo. Addition of anhydrous ether gave a precipitate which was worked up to yield 900 mg. of pure N-(1-methoxy)-methylchlortetracycline.

EXAMPLE 6

*Preparation of N-(1-methoxy)-ethylchlortetracycline*

Chlortetracycline (7.2 g.; 0.015 mole) was added to a mixture of stirred methanol (30 ml.) and acetaldehyde (15 ml.), then refluxed 2.75 hours. After cooling, the solvent was removed in vacuo, and the residue worked up with anhydrous ether. This yielded 5.47 g. of crude product. An analytically pure sample was obtained by dissolving 2 g. of crude product in 200 ml. of chloroform, then washing with several portions of water. The chloroform solution was dried over anhydrous $Na_2SO_4$, and evaporated in vacuo. The residue obtained was worked up with anhydrous ether. The yield was 820 mg. of pure N-(1-methoxy)-ethylchlortetracycline.

EXAMPLE 7

*Preparation of N-(1-methoxy)-propylchlortetracycline*

Chlortetracycline (9.6 g.; 0.02 mole) was added to a mixture of stirred methanol (120 ml.) and propionaldehyde (40 ml.), then refluxed 1.5 hour. After cooling, the solvent was removed in vacuo, and the residue worked up with anhydrous ether. This yielded 9.7 g. of crude product. An analytically pure sample was obtained by dissolving 2 g. of the crude product in 100 ml. of chloroform, and washing with several portions of water. The chloroform extract was dried over anhydrous $Na_2SO_4$, then taken to dryness in vacuo. The solid was worked up with anhydrous ether, to give 850 mg. of pure N-(1-methoxy)-propylchlortetracycline.

EXAMPLE 8

*Preparation of N-(1-methoxy)-methylchlortetracycline ethylenediamine salt*

N-(1-methoxy)-methylchlortetracycline (500 mg.; 0.95 mole) was added to 14 ml. of a 10% water in methanol solution. Triethylamine (0.28 ml.) was added and the solution warmed to 50° C. To this was added 2.0 ml. of a solution of ethylenediamine in methanol (previously prepared by mixing 1.6 ml. ethylenediamine and 14.4 ml. methanol). After several minutes of stirring, crystalline diamine salt appears. After cooling and filtering, the crystals are washed with a small volume of 10% water in methanol, then anhydrous ether, and dried. The yield was 150 mg. of N-(1-methoxy)-methylchlortetracycline ethylenediamine salt.

EXAMPLE 9

*Preparation of N-(1-methoxy)-ethylchlortetracycline ethylenediamine salt*

N-(1-methoxy)-ethylchlortetracycline (125 mg.; 0.23 mole) was added to 5 ml. of a 10% water in methanol solution. Triethylamine was added to pH 8.15. To this was added 0.5 ml. of a solution of ethylenediamine in methanol (previously prepared as in the preceding example). Crystallization occurred after a minute. The crystals were filtered, washed with ether, and dried to yield analytically pure N-(1-methoxy)-ethylchlortetracycline ethylenediamine salt.

EXAMPLE 10

*Preparation of powder for oral suspension*

A powder for oral suspension is prepared as follows:
(A) To 500 g. of coating sugar is added 27.94 g. sorbitan trioleate dispersed in 33.3 ml. of 1,1,1-trichloroethane and blended. This premix is dried at 50° C. for 5 hours in an oven.
(B) 60 g. of coating sugar is placed in a mixer and to it is added 11.136 g. of custard flavor and blended.
(C) 27 g. of coating sugar and 2.784 g. sodium bisulfite U.S.P. are mixed and barrel rolled for 10 minutes, then milled through a comminuting machine at 5000 revolutions per minute using a #00 screen.
(D) To a blender is added 1.65 kg. coating sugar, the sodium bisulfite preblend (C) above, 108.8 g. of N-(1-methoxy)-propylchlortetracycline, 5.568 g. sodium benzoate, 5.568 g. sodium alginate and 16.752 g. of purified sodium carrogheenate. After blending for 10 minutes the sugar-sorbitan trioleate-1,1,1-trichloroethane (A) above, is added with the custard flavor-sugar premix (B) above. The total blend is then screened through a comminuting machine at 5,000 revolutions per minute using a #2 screen, and further blended for 30 minutes. The final powder is bottled, each bottle containing 25.8 g. and reconstitutable in suspension to 60 cc. with water before use.

EXAMPLE 11

*Preparation of antibiotic syrup*

A syrup for oral administration is prepared as follows: 350 ml. of liquid sucrose is heated to 60° C. and 19.0 g. of monobasic sodium phosphate is added along with 3.80 g. of F.D. & C. red dye and heating is continued to 80° C. After about 5 minutes at 80° C. the hot mixture is added to 3.059 l. of liquid sucrose and thoroughly mixed. Then 127 g. of N-(1-methoxy)-propylchlortetracycline is added, the mixture stirred mechanically and volume made up to 3.65 l. with distilled water. The batch is passed through a filter, homogenized and deaerated. Meanwhile, 3.04 g. methylparaben U.S.P. and 0.760 g. propylparaben, dissolved in 37.78 g. (40.28 cc.) ethyl alcohol U.S.P. is mixed with 3.99 g. imitation cherry flavor. This is added to the main batch and the total made up to 3.8 l. with distilled water.

EXAMPLE 12

*Preparation of N-(1-benzyloxy)-methyltetracycline*

Tetracycline (8.88 g.; 0.02 mole) was added to a mixture of 37% formaldehyde (50 ml.) and benzyl alcohol (40 ml.) in tetrahydrofuran (170 ml.). The mixture was refluxed for 2 hours. After cooling, the solvent was removed under vacuum. The residue was working up with anhydrous ether, filtered, and dried. This gave 7.5 g. of crude material. A 2 g. portion was added to chloroform (200 ml.) and water (50 ml.) was added. The chloroform was removed, and more chloroform (100 ml.) was used to re-extract from the water phase. After combination of the chloroform extracts and washing with water, the chloroform was dried over $Na_2SO_4$, filtered, and evaporated under vacuum. Work up of the yellow solid with dry ether gave N-(1-benzyloxy)-methyltetracycline.

EXAMPLE 13

*Preparation of N-(1-methoxy)-methyl-6-demethyltetracycline*

6-demethyltetracycline (8.6 g.; 0.02 mole) was added to a mixture of methanol (120 ml.) and 46.5% formaldehyde in methanol (40 ml.) and refluxed with stirring. After 75 minutes the clear solution was cooled. A 40 ml. aliquot when treated with $H_2O$ (10 ml.) and left at 5° C. for several days yielded a crystalline solid. The crystals were filtered, washed with ether, and dried to give N-(1-methoxy)-methyl-6-demethyltetracycline.

EXAMPLE 14

*Preparation of N-(1-methoxy)-propyl-6-demethyltetracycline*

To a mixture of methanol (40 ml.) and propionaldehyde (15 ml.) was added 6-demethyltetracycline (2.15 g.; 0.005 mole) and the mixture refluxed 2¼ hours, during which time a clear solution developed. An aliquot (13 ml.) of the reaction solution was cooled to 5° C., then diluted with water (2 ml.) and left at 5° C. for 2 days. The resulting crystalline solid was filtered and washed with anhydrous ether to give N-(1-methoxy)-propyl-6-demethyltetracycline.

EXAMPLE 15

*The utility of N-(1-methoxy)-methyltetracycline for 2-carboxamido protection under dehydrating conditions*

N-(1-methoxy)-methyltetracycline (1 g.) was dissolved in pyridine (10 ml.) and the solution cooled to 0° C. To this was slowly added methanesulfonyl chloride (keeping the temperature below 5° C.). After 1 hour the mixture was filtered and the filtrate precipitated into ether (40 ml.). A gummy solid formed which was washed several times with ether, and worked up with acetone. By paper chromatography, as well as ultraviolet and infrared analyses, it was shown that no dehydration to the nitrile occurred at the 2-position. By contrast, when tetracycline was treated by exactly the same procedure, a good yield of the 2-nitrile was obtained. In similar fashion exposure of N-(1-methoxy)-methyltetracycline to dicyclohexylcarbodiimide caused no dehydration to the nitrile whereas tetracycline was readily converted to the inactive nitrile derivative.

What is claimed is:
1. A compound selected from the group consisting of compounds of the formula:

wherein TC represents all except the 2-carboxamido group of a member selected from the group consisting of tetracycline, 7-chlorotetracycline, 7-bromotetracycline, 5-hydroxytetracycline, 6-demethyltetracycline and 6-demethyl-7-chlorotetracycline; R is selected from the group consisting of hydrogen and lower alkyl; and R' is selected from the group consisting of lower alkyl and phenyl lower alkyl; and the acid-addition and base salts thereof.

2. N-(1-methoxy)-methyltetracycline.
3. N-(1-methoxy)-ethyltetracycline.
4. N-(1-methoxy)-propyltetracycline.
5. N-(1-ethoxy)-methyltetracycline.
6. N-(1-methoxy)-methyl-7-chlorotetracycline.
7. N-(1-methoxy)-ethyl-7-chlorotetracycline.

8. N-(1-methoxy)-propyl-7-chlorotetracycline.
9. N-(1-ethoxy)-methyl-7-chlorotetracycline.
10. N-(1-methoxy)-methyl-6-demethyl-7-chlorotetracycline.
11. N-(1-ethoxy)-ethyl-6-demethyl-7-chlorotetracycline.
12. N-(1-isopropoxy)-ethyl-6-demethyl-7-chlorotetracycline.
13. N-(1-benzyloxy)-methyltetracycline.
14. N-(1-methoxy)-methyl-6-demethyltetracycline.
15. N-(1-methoxy)-propyl-6-demethyltetracyline.

References Cited by the Examiner

FOREIGN PATENTS 955,902  4/1964  Great Britain.

OTHER REFERENCES

Chemical Abstracts, vol. 57, page 15250F, December 1962, abstract of Belgium Patent 615,398, issued April 13, 1962.

NICHOLAS S. RIZZO, *Primary Examiner.*

JAMES W. ADAMS, *Assistant Examiner.*